US012658753B2

(12) United States Patent
Jang et al.

(10) Patent No.: US 12,658,753 B2
(45) Date of Patent: Jun. 16, 2026

(54) BOBBIN FOR MOTOR

(71) Applicants: Hyundai Motor Company, Seoul
(KR); Kia Corporation, Seoul (KR)

(72) Inventors: Hyung Kwan Jang, Uijeongbu (KR);
Hoo Dam Lee, Seoul (KR); **Kyung Sik
Choi, Seoul (KR); Jun Hyeok Choi**,
Suwon-si (KR); Byung Ho Min,
Suwon-si (KR); Tae Gyu Lee, Seoul
(KR)

(73) Assignees: Hyundai Motor Company, Seoul
(KR); Kia Corporation, Seoul (KR)

( * ) Notice: Subject to any disclaimer, the term of this
patent is extended or adjusted under 35
U.S.C. 154(b) by 198 days.

(21) Appl. No.: 18/414,780

(22) Filed: Jan. 17, 2024

(65) Prior Publication Data

US 2025/0079919 A1     Mar. 6, 2025

(30) Foreign Application Priority Data

Aug. 30, 2023    (KR) ........................ 10-2023-0114752

(51) Int. Cl.
*H02K 3/04*          (2006.01)
*H02K 3/30*          (2006.01)
(52) U.S. Cl.
CPC ................. *H02K 3/04* (2013.01); *H02K 3/30*
(2013.01); *H02K 2203/12* (2013.01); *H02K
2213/03* (2013.01)
(58) Field of Classification Search
CPC ........ H02K 3/04; H02K 3/30; H02K 2203/12;
H02K 2213/03

USPC .......................................................... 310/203
See application file for complete search history.

(56) References Cited

U.S. PATENT DOCUMENTS

| | | | | |
|---|---|---|---|---|
| 7,741,738 B2 * | 6/2010 | Ries | ....................... | H02K 55/04 |
| | | | | 310/91 |
| 2008/0100151 A1 * | 5/2008 | Takeuchi | ............... | H02K 21/04 |
| | | | | 310/156.01 |
| 2009/0251014 A1 * | 10/2009 | Goodzeit | ............... | H02K 7/003 |
| | | | | 310/52 |
| 2012/0194021 A1 * | 8/2012 | Nakatsugawa | ...... | H02K 49/102 |
| | | | | 310/103 |
| 2013/0009523 A1 * | 1/2013 | Takeuchi | ............... | H02K 1/278 |
| | | | | 310/68 B |
| 2013/0020900 A1 * | 1/2013 | Takeuchi | ............... | H02K 5/128 |
| | | | | 310/214 |
| 2013/0026861 A1 * | 1/2013 | Takeuchi | ................ | H02K 3/47 |
| | | | | 310/43 |
| 2013/0162091 A1 * | 6/2013 | Arimatsu | ............... | H02K 1/274 |
| | | | | 310/156.53 |

(Continued)

FOREIGN PATENT DOCUMENTS

| | | |
|---|---|---|
| JP | 6634372 B2 | 1/2020 |
| KR | 10-2000-0007386 A | 2/2000 |

(Continued)

*Primary Examiner* — Rashad H Johnson
(74) *Attorney, Agent, or Firm* — Banner & Witcoff, Ltd.

(57)                ABSTRACT

Proposed is a bobbin for a superconducting motor by which
cooling performance can be obtained and structural stability
can be expected. The bobbin for a motor includes a bobbin
body on which a superconducting coil is wound and a
reinforcement including a reinforced plastic including rein-
forcing fiber and surrounding a side surface of the bobbin
body.

18 Claims, 6 Drawing Sheets

(56) References Cited

U.S. PATENT DOCUMENTS

| | | | | |
|---|---|---|---|---|
| 2014/0054992 A1* | 2/2014 | Hasegawa | .............. | H02K 5/128 |
| | | | | 310/86 |
| 2014/0084759 A1* | 3/2014 | Takeuchi | ............... | H02K 1/278 |
| | | | | 310/68 B |
| 2014/0228519 A1* | 8/2014 | Nakayama | ................ | B29B 9/12 |
| | | | | 525/119 |
| 2014/0342144 A1* | 11/2014 | Nakayama | ............... | C08J 5/248 |
| | | | | 428/220 |
| 2014/0356612 A1* | 12/2014 | Sano | ........................ | C08J 5/042 |
| | | | | 428/300.1 |
| 2015/0247025 A1* | 9/2015 | Ichikawa | ................... | C08J 5/06 |
| | | | | 427/398.1 |
| 2017/0349720 A1* | 12/2017 | Hiasa | ..................... | D06M 13/11 |
| 2018/0346668 A1* | 12/2018 | Ichikawa | ............ | D06M 13/148 |

FOREIGN PATENT DOCUMENTS

| | | |
|---|---|---|
| KR | 101629759 B1 | 6/2016 |
| KR | 10-2019-0033096 A | 3/2019 |
| WO | 2016-010023 A1 | 1/2016 |

* cited by examiner

C:support
Equivalet Stress
Type: Equivalet (von-M)
Unit: MPa
Time: 1s
2023-04-11  AM 11:05

93.953 Max
83.667
73.381
63.095
52.81
42.524
32.238
21.952
11.666
1.3804 Min

BOBBIN FOR MOTOR

CROSS REFERENCE TO RELATED APPLICATION

The present application claims priority to Korean Patent Application No. 10-2023-0114752, filed Aug. 30, 2023, the entire contents of which are incorporated herein for all purposes by this reference.

BACKGROUND

Field

The present disclosure relates generally to a bobbin for a motor and, more particularly, to a bobbin for a motor by which cooling performance can be obtained and structural stability can be expected.

Discussion of the Background

Generally, development of drive motors is required to improve the performance and fuel efficiency of electric vehicles (EVs) or hybrid electric vehicles (HEVs) using electricity as the main power.

In 1911, Heike Kamerlingh-Onnes of Leiden University in the Netherlands discovered a phenomenon in which electrical resistance suddenly disappears at an absolute temperature of 4.2K (minus 268.8° C.) while conducting an experiment to measure the electrical resistance of mercury. As a result, low-temperature superconductors, such as NbTi and SnTi, began to be used in applications requiring high magnetic fields.

In 1987, a high-temperature superconductor was discovered by Johannes Bednorz and Karl Muller in Switzerland, and since then, active research has been conducted to improve the critical temperature and critical current density of high-temperature superconductors.

Accordingly, research has recently been conducted on technology for applying superconductors to drive motors in order to improve the performance. As part of such research, a superconducting internal-permanent magnet synchronous motor (IPMSM) has been proposed.

The foregoing is intended merely to aid in the understanding of the background of the present disclosure, and is not intended to mean that the present disclosure falls within the purview of the related art.

SUMMARY

Accordingly, the present disclosure has been made keeping in mind the above problems, and the present disclosure is intended to propose a bobbin for a superconducting motor by which cooling performance can be obtained and structural stability can be expected.

The objective of the present disclosure is not limited to the aforementioned description, and other objectives not explicitly disclosed herein will be clearly understood by those skilled in in the art from the description provided hereinafter.

A bobbin for a motor may comprise: a bobbin body on which a superconducting coil is wound; and a reinforcement comprising a reinforced plastic comprising a reinforcing fiber, wherein the reinforcement is configured to surround a side surface of the bobbin body.

The bobbin body may be made of one selected from among aluminum (Al), Al alloy, steel, steel alloy, stainless steel, and an electrical sheet, and the reinforcement may be made of carbon fiber reinforced plastic (CFRP).

The bobbin body may comprise: a core on which the superconducting coil is wound; and a cover configured to cover an outer portion of the superconducting coil, wherein the cover is spaced apart from the core by a space in which the superconducting coil is wound on the core, and wherein the reinforcement surrounds a side surface of the cover.

The reinforcement may surround the cover of the bobbin body in an area corresponding to an area in which the superconducting coil is wound.

The reinforcement may surround the cover of the bobbin at a height that is equal to a height at which the superconducting coil is wound.

A height of a top portion of the reinforcement may be lower than or equal to a height of a top portion of a winding of the superconducting coil, and a height of a bottom portion of the reinforcement may be lower than or equal to a height of a bottom portion of the winding of the superconducting coil.

The superconducting coil may be wound in a racetrack shape comprising a pair of linear portions parallel to each other and a pair of arc portions each connecting corresponding ends of the pair of linear portions. A ratio of a thickness of the cover covering the linear portions of the superconducting coil to a thickness of the reinforcement may be in a range of about 2:1 to about 2:2.

A thickness of the reinforcement may be in a range of about 0.05 mm to 5 mm.

The bobbin body may be made of one selected from among aluminum (Al), Al alloy, steel, steel alloy, stainless steel, and an electrical sheet, and the reinforcing fiber may comprise a glass fiber.

A motor (e.g., a motor for a vehicle) may comprise: a superconducting coil; and a bobbin, wherein the bobbin comprises: a bobbin body on which the superconducting coil is wound; and a reinforcement comprising a reinforced plastic comprising a reinforcing fiber, wherein the reinforcement is configured to surround a side surface of the bobbin body.

According to the present disclosure, the reinforcement of CFRP may be provided on the side surface of the bobbin body on which the superconducting is coil wound in order to structurally protect the side portions of the bobbin body. Consequently, it is possible to minimize the thickness of the bobbin while maximizing the performance of the superconducting coil.

In addition, it is possible to obtain electrical properties and driving stability of the superconducting coil by reducing the displacement of the superconducting coil occurring in a high magnetic field environment.

Furthermore, it is possible to maximize the performance of the superconducting coil by reducing superconducting quench in which superconductivity is lost and resistance rapidly increases by obtaining cooling performance and structural stability, thereby increasing specific output of the superconducting motor.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
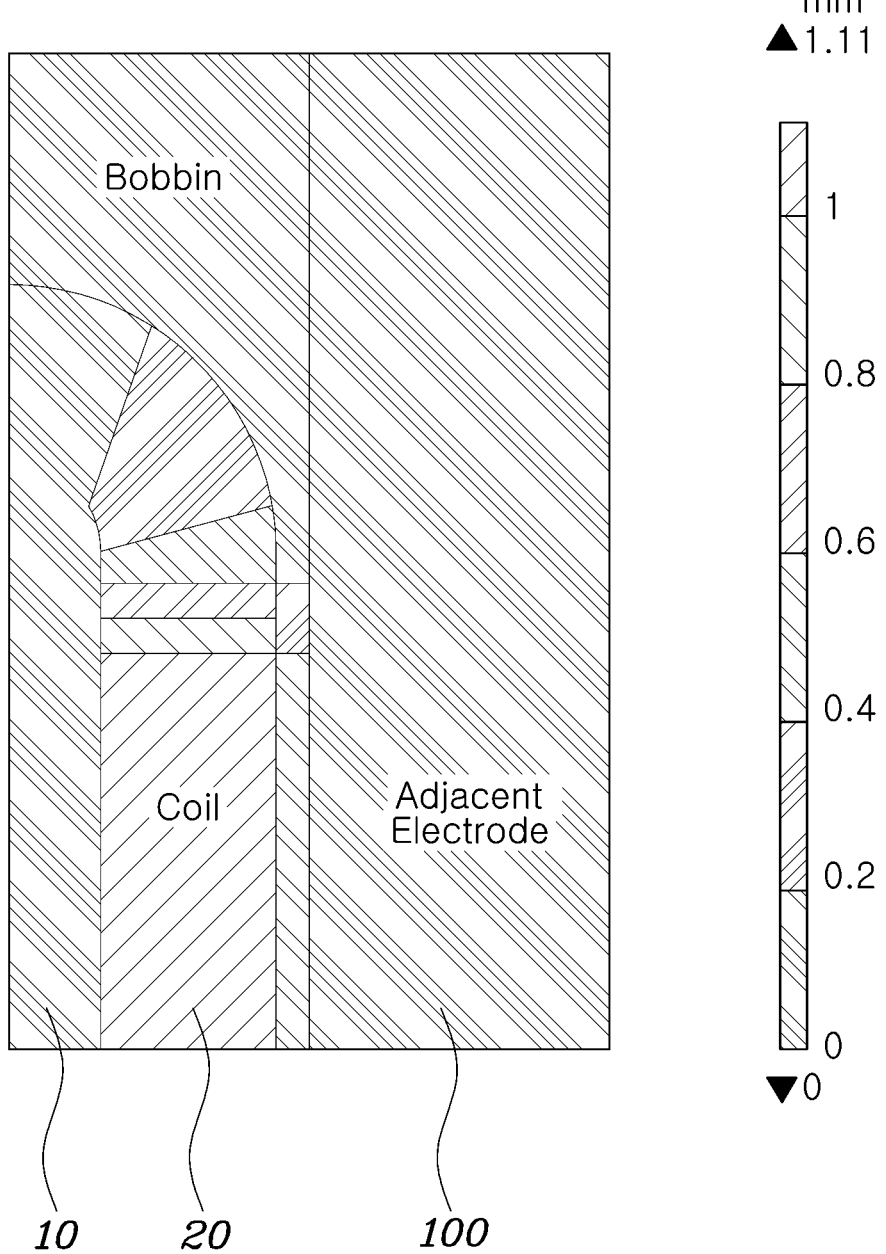
FIG. 1 is a schematic diagram illustrating the degree of displacement according to the area of a bobbin in a superconducting motor including superconducting coils.

Hereinafter, various examples disclosed in the present disclosure will be described in detail with reference to the accompanying drawings, in which identical or similar constituent elements are given the same reference numerals regardless of the reference numerals of the drawings, and a repeated description thereof will be omitted.

In the description of the present disclosure, when it is determined that the detailed description of known art would obscure the gist of the present disclosure, the detailed description thereof will be omitted. In addition, the attached drawings are merely intended to be able to readily understand the features disclosed herein, and thus the technical idea disclosed herein is not limited by the attached drawings, and it should be understood to include all changes, equivalents, and substitutions included in the idea and technical scope of the present disclosure.

It will be understood that, although terms "first", "second", etc., may be used herein to describe various elements, these elements should not be limited by these terms. These terms are only used to distinguish one element from another element.

It will be understood that when an element is referred to as being "connected" or "linked" to another element, it can be directly connected or linked to the other element or intervening elements may be present therebetween. In contrast, it should be understood that when an element is referred to as being "directly connected" or "directly linked" to another element, there are no intervening elements present.

As used herein, the singular forms "a", "an", and "the" are intended to include the plural forms as well, unless the context clearly indicates otherwise.

It will be further understood that the terms "comprise", "include", "have", etc. when used in this specification, specify the presence of stated features, integers, steps, operations, elements, components, and/or combinations thereof but do not preclude the presence or addition of one or more other features, integers, steps, operations, elements, components, and/or combinations thereof.

First, a bobbin for a superconducting motor may be a bobbin on which superconducting coils are wound. For example, the bobbin may be implemented as a bobbin of a rotor in a superconducting internal-permanent magnet synchronous motor (IPMSM) or any other types of motors. The bobbin for a superconducting motor is not limited to the bobbin of the rotor, but may be implemented as a bobbin of a stator when superconducting coils are provided on the stator or a bobbin for other hardware elements.

In general, a superconducting IPMSM is characterized by generating an electromagnetic field using a superconducting material and having high efficiency and performance due to permanent magnets provided therein.

In the superconducting IPMSM, it is generally required to design a housing, e.g., a bobbin, to obtain cooling performance and structural stability when superconducting coils are provided on the rotor.

Since superconducting generates a strong magnetic field of 5T or higher as described herein, an improved structure of the bobbin may be required to be safe against strong magnetic fields. For example, to generate stronger magnetic fields the thickness of one or more parts (e.g., one or more body parts that accommodate a coil structure) of the bobbin may be reduced to enlarge the cavity or inner space of the bobbin that accommodates one or more elements such as the coil structure). The enlarged cavity or inner space would allow to accommodate a coil structure that generates stronger magnetic fields. As the thickness of the inner wall is reduced, a safer structure for the bobbin may be required.

In addition, when the bobbin is designed, material designing and structural designing of the bobbin are performed together, and the safety of the bobbin is obtained by the strength of the material and the structural designing.

FIG. 1 is a schematic diagram illustrating the degree of displacement according to the area of a bobbin in a superconducting motor including superconducting coils. As illustrated in FIG. 1, a superconducting coil 20 is wound on a bobbin body 10, a portion of which surrounds the outer portion of the superconducting coil 20 to separate the superconducting coil 20 and an adjacent pole 100 from each other while protecting the superconducting coil 20.

The bobbin body 10 may be made of one of high thermal conductivity materials such as aluminum (Al), Al alloy, steel, steel alloy, stainless steel, and an electrical sheet. During operation of the motor, the superconducting coil 20 may be displaced by a strong c field generated by the superconducting coil 20. A portion of the bobbin 10, e.g., a relatively thin area of the structure of the bobbin 10, surrounding the outer portion of the superconducting coil 20 between the bobbin 10 and the adjacent pole 100 may be damaged.

Therefore, in order to prevent a damage to the vulnerable parts of the bobbin, the thickness and material of the bobbin are major design factors in safety designing of the bobbin structure.

However, the properties of the material of the bobbin are limited, and increases in the thickness of the bobbin reduce the space and/or area for the superconducting coil (e.g., reduce the number of turns of the superconducting coil). Thus, the performance of the superconducting coil may be disadvantageously degraded.

In this regard, the present disclosure proposes a bobbin for a superconducting motor provided with a reinforcement surrounding a bobbin body of the bobbin, by which cooling performance can be obtained and structural stability can be expected.

Figure 2:
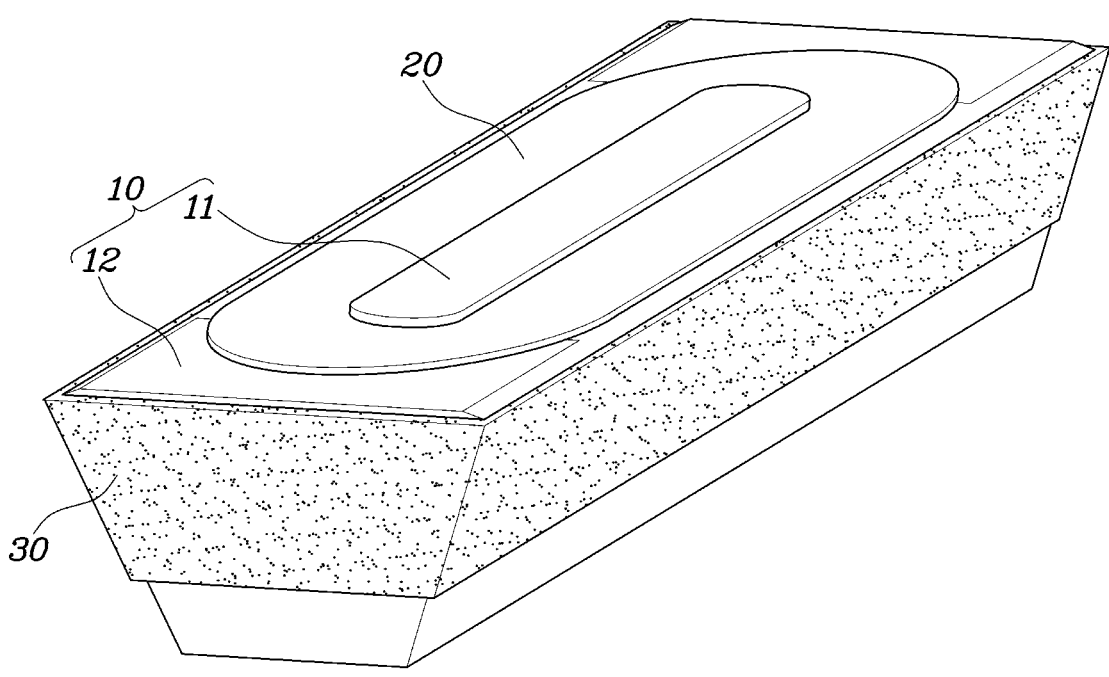
FIG. 2 is a perspective diagram illustrating a bobbin for a superconducting motor.
Figure 3:
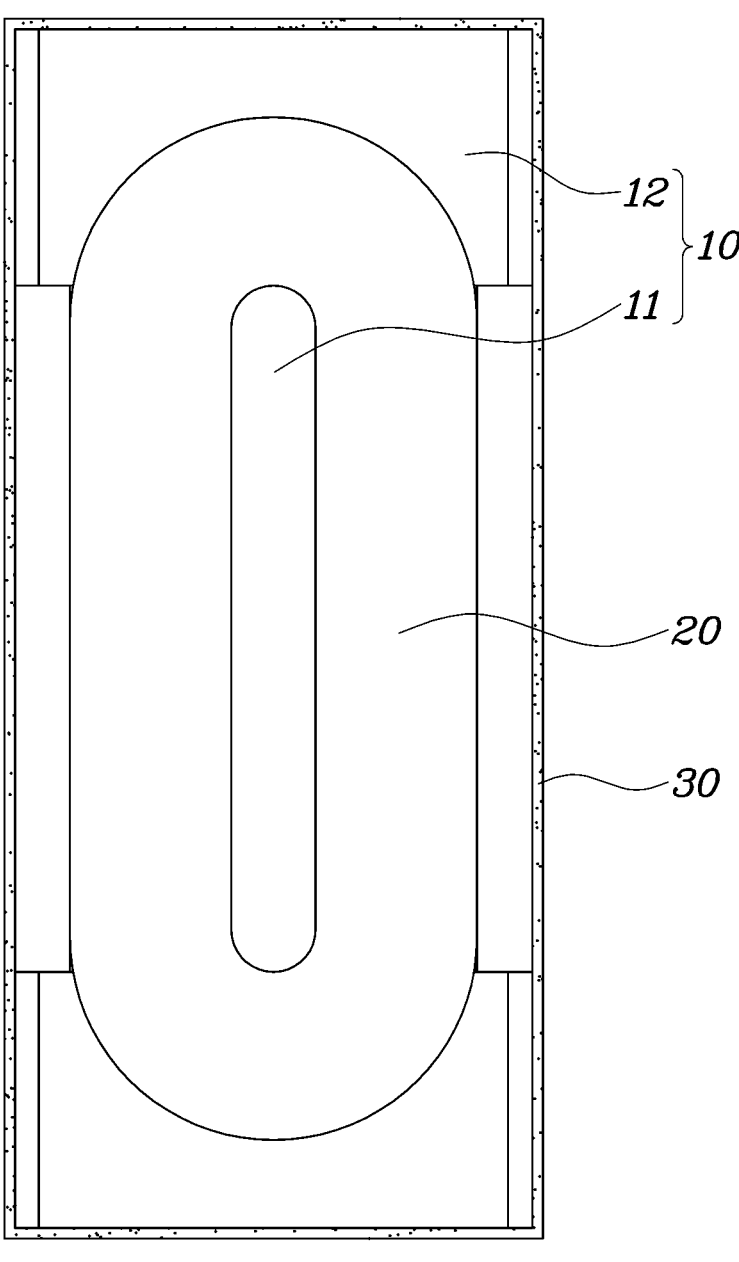
FIG. 3 is a plan diagram illustrating the bobbin for a superconducting motor.
Figure 4:
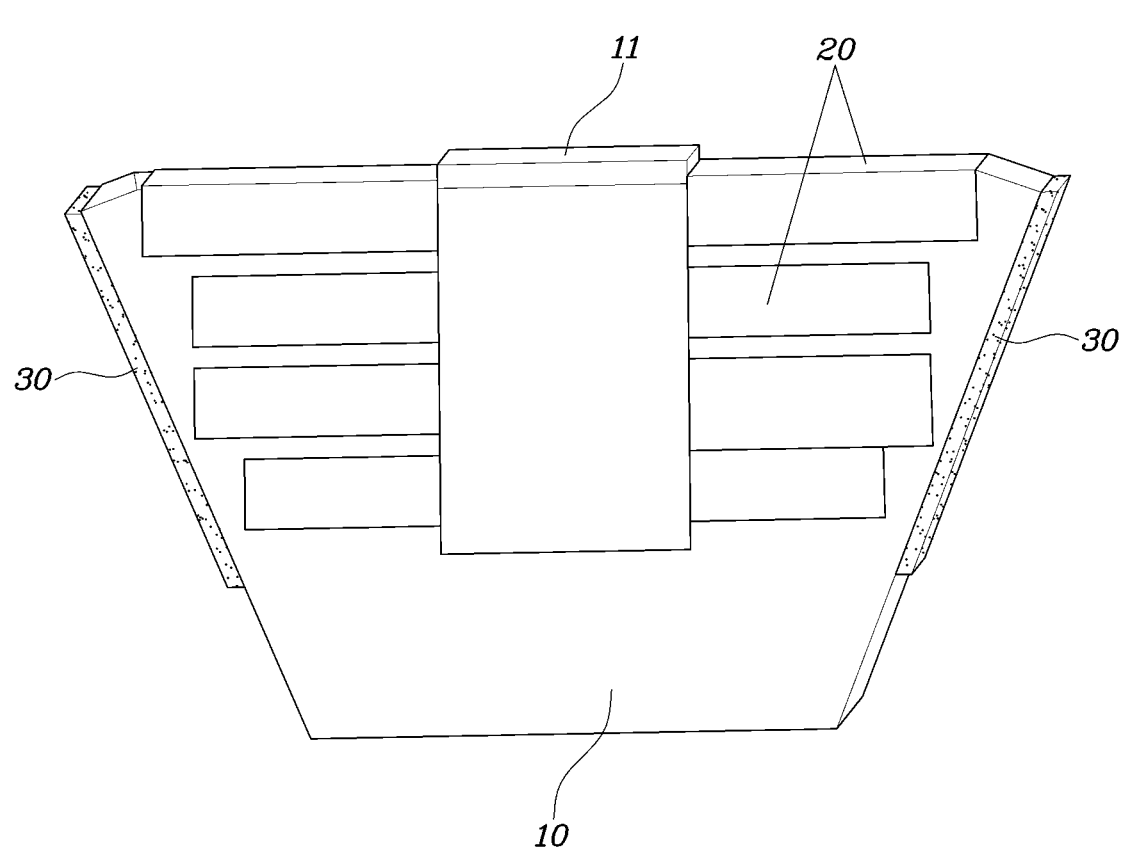
FIG. 4 is a cross-sectional diagram illustrating the bobbin for a superconducting motor.

FIG. 2 is a perspective diagram illustrating a bobbin for a superconducting motor, FIG. 3 is a plan diagram illustrating the bobbin for a superconducting motor, and FIG. 4 is a cross-sectional diagram illustrating the bobbin for a superconducting motor.

As illustrated in FIGS. 2 to 4, the bobbin for a motor generally includes: a bobbin body 10 on which a superconducting coil 20 is wound; and a reinforcement 30 made of a reinforced plastic including reinforcement fiber and surrounding a side surface of the bobbin body 10.

The bobbin body 10 has a configuration allowing the superconducting coil 20 to be wound thereon. The bobbin body 10 includes a core 11 on which the superconducting coil 20 is wound and a cover 12 spaced apart from the core 11 by a space in which the superconducting coil 20 is wound on the core 11 and configured to cover the outer portion of the superconducting coil 20.

The superconducting coil 20 may be wound on the bobbin body 10 in the shape of a racetrack having a pair of linear portions parallel to each other and a pair of arc portions each connecting corresponding ends of the pair of linear portions.

Thus, the outer circumferential portion of the core 11 of the bobbin body 10 is provided in the shape of a racetrack to correspond to the inner circumferential shape of the superconducting coil 20 wound on the core 11.

In the same manner, the inner circumferential portion of the cover 12 of the bobbin body 10 may be provided in the shape of a racetrack to correspond to the outer circumferential shape of the superconducting coil 20 wound on the core 11. Here, portions of the cover 12 of the bobbin body 10 covering the curved portions of the superconducting coil 20 may be formed to be thicker, while portions of the cover 12 of the bobbin body 10 covering the linear portions of the superconducting coil 20 are formed to be thinner.

Thus, the outer circumferential surface of the cover 12 of the bobbin body 10 may have substantially a rectangular shape.

The bobbin body 10 may be made of one of high thermal conductivity materials such as Al, Al alloy, steel, steel alloy, stainless steel, and an electrical sheet. Here, the material of the bobbin body 10 has required thermal conductivity, but the stiffness thereof may be insufficient. Thus, when the motor is operated, the cover 12 of the bobbin body 10 may be changed or deformed due to the displacement of the superconducting coil 20.

In order to address such problems, in the present disclosure, the reinforcement 30 may be provided on the outer circumferential surface of the bobbin body 10.

The reinforcement 30 may be formed of a material having higher stiffness and lower thermal contraction and expansion than the material of the bobbin body 10. Thus, the bobbin may be configured to maintain the stiffness while having low overall thickness.

For example, the reinforcement 30 may be made of a reinforced plastic including reinforcing fiber. For example, the reinforcement 30 may be made of carbon fiber reinforced plastic (CFRP).

CFRP is a composite material comprised of a carbon fiber and a thermosetting resin. CFRP has high specific intensity, excellent fatigue/creep properties, excellent weather/chemical resistance, low thermal contraction/expansion, and the like. In particular, CFRP is about 4 times lighter than steel, with the strength thereof being about 9 times that of steel.

The reinforcement 30 may be configured to surround the cover 12 of the bobbin body 10 in an area corresponding to an area in which the superconducting coil 20 is wound in order to prevent the bobbin from being damaged or fractured according to the displacement of the superconducting coil 20.

Here, the reinforcement 30 may be wound on the cover 12 of the bobbin body 10 at the same height as the height at which the superconducting coil 20 is wound.

The height of the top of the reinforcement 30 may be the same as or lower than the height of the top of the winding of the superconducting coil 20, while the height of the bottom of the reinforcement 30 may be the same as or lower than the height of the bottom of the winding of the superconducting coil 20.

In particular, since the thickness of the reinforcement 30 determines the overall thickness of the bobbin, the reinforcement 30 may be configured to be thin (e.g., from about 0.05 mm to about 5 mm for some bobbins) to the extent that the stiffness thereof is not affected.

For example, in the thickness of the reinforcement 30 with respect to the thickness of the cover 12 that covers the linear portions of the superconducting coil 20, the ratio of the thickness of the cover with respect to the reinforcement may be maintained in the range of 2:1 to 2:2.

If the reinforcement 30 is thicker than the thickness in the range of the ratio of the thickness of the cover with respect to the reinforcement, the thickness of the cover 12 of the bobbin body 10 may be reduced or the number of turns of the superconducting coil 20 may be reduced, thereby disadvantageously lowering the efficiency of the motor.

In contrast, if the reinforcement 30 is thinner than the thickness in the range of the ratio of the thickness of the cover with respect to the reinforcement, the structural stability of the bobbin may not be obtained.

As described above, the reinforcement 30 may be a composite material comprised f a carbon fiber and a thermosetting resin. The carbon fiber may be a filament fiber comprised of relatively long filaments or a continuous fiber oriented in a specific direction. The carbon fiber may also be formed by weaving a continuous fiber.

Since the reinforcement 30 is oriented in a specific direction, when the reinforcement 30 is formed, the reinforcement 30 may be wound to surround the outer surface of the bobbin body 10 along the direction of the carbon fiber.

Here, CFRP of the reinforcement 30 may be manufactured as a sheet or tape to be wound around the outer circumferential surface of the bobbin body 10. The direction of winding may be clockwise or counterclockwise with respect to the plan diagram of FIG. 3.

Hereinafter, the present disclosure will be described with reference to a comparative example and an example.

In the comparative example, a bobbin only including a bobbin body without a reinforcement was used. Here, the thickness of the bobbin body, i.e., an area covering linear portions of a superconducting coil, was set 3 mm.

In contrast, in the example, a reinforcement was provided on the outer circumferential surface of bobbin body according to the present disclosure. Here, the thickness of the bobbin body, i.e., an area covering linear portions of a superconducting coil, was set 2 mm, and the thickness of the reinforcement was 1 mm.

In order to achieve the above at least one of the above objectives, according to one aspect of the present disclosure, there is provided a bobbin for a motor, the bobbin including: a bobbin body on which a superconducting coil is wound; and a reinforcement including a reinforced plastic including reinforcing fiber and surrounding a side surface of the bobbin body.

The bobbin body may be made of one selected from among aluminum (Al), Al alloy, steel, steel alloy, stainless steel, and an electrical sheet. The reinforcement may be made of carbon fiber reinforced plastic (CFRP).

The bobbin body may include: a core on which the superconducting coil is wound; and a cover spaced apart from the core by a space in which the superconducting coil is wound on the core and configured to cover an outer portion of the superconducting coil. The reinforcement may surround a side surface of the cover.

The reinforcement may surround the cover of the bobbin body in an area corresponding to an area in which the superconducting coil is wound.

The reinforcement may surround the cover of the bobbin at a height the same as a height at which the superconducting coil is wound.

The height of a top of the reinforcement may be the same or lower than the height of a top of the winding of the superconducting coil. The height of a bottom of the reinforcement may be the same or lower than the height of a bottom of the winding of the superconducting coil.

The superconducting coil may be wound in a racetrack shape including a pair of linear portions parallel to each other and a pair of arc portions each connecting corresponding ends of the pair of linear portions. The ratio of the thickness of the cover covering the linear portions of the superconducting coil with respect to the reinforcement may be in the range of 2:1 to 2:2.

Figure 5A:
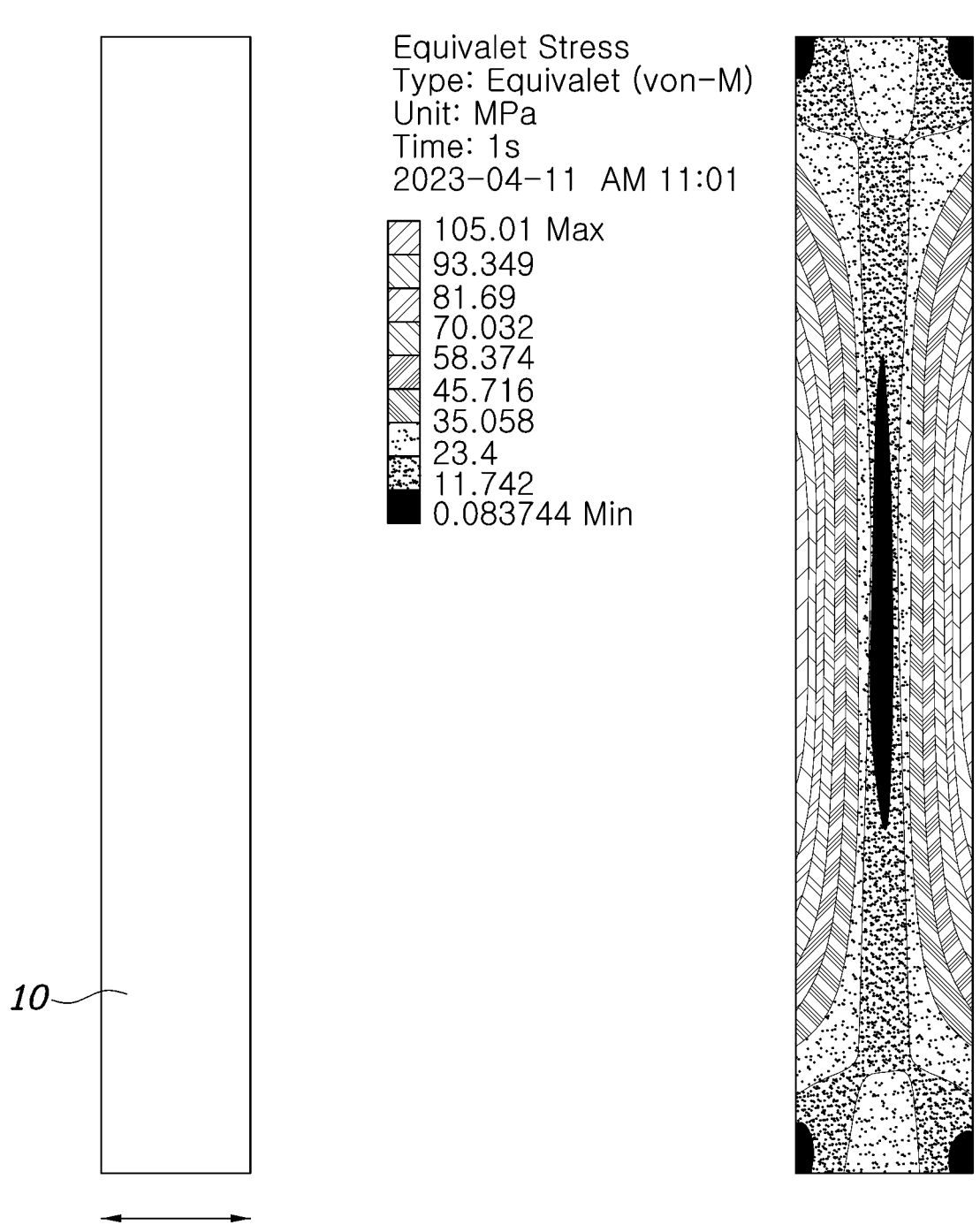
FIG. 5A is a diagram illustrating the degree of stress occurring on a side cover portion of a bobbin body according to a comparative example.
Figure 5B:
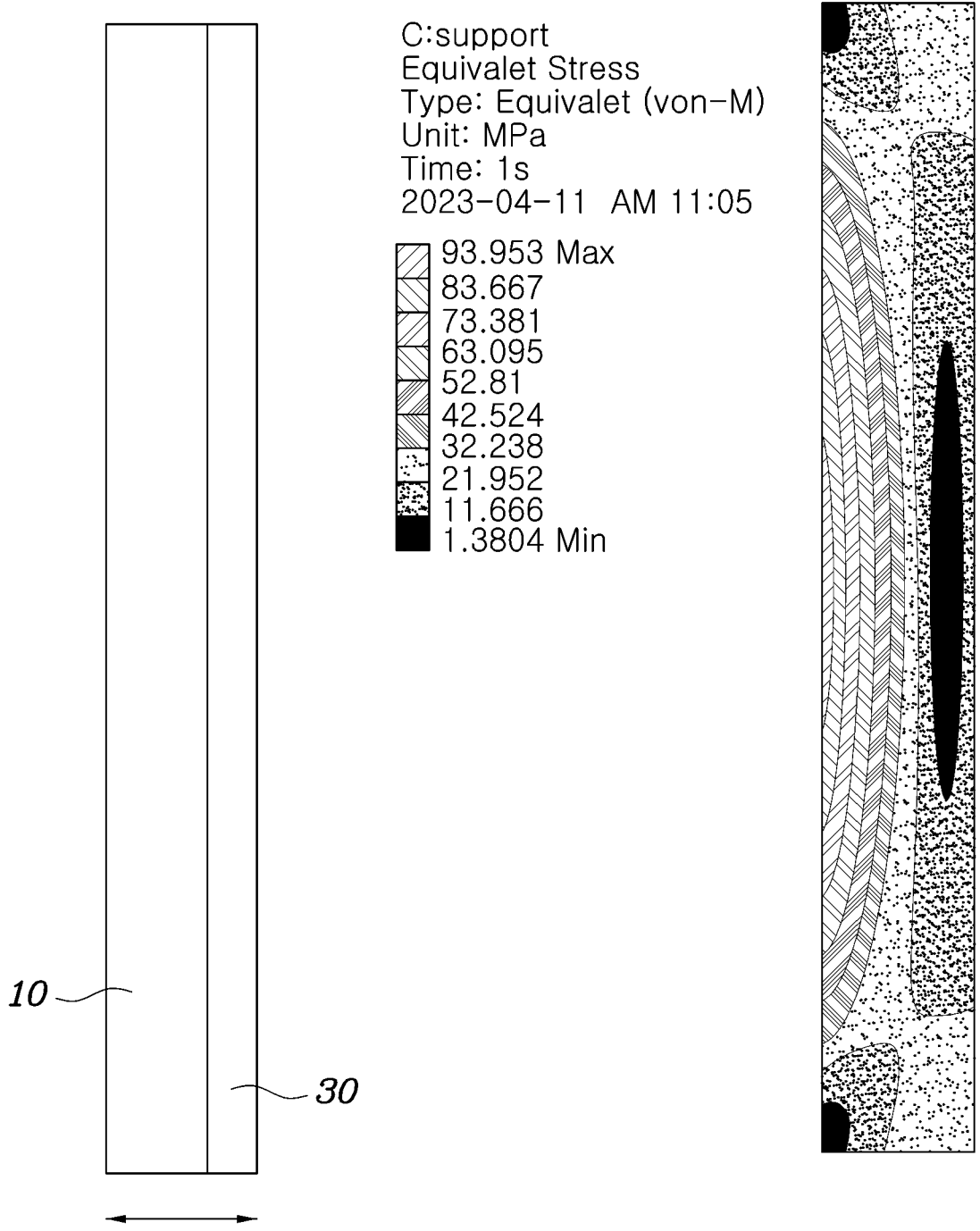
FIG. 5B is a diagram illustrating the degree of stress occurring on a side cover portion of a bobbin body according to an example of the present disclosure.

In the bobbins prepared as above, the degree of stress occurring on the linear portion of each of the bobbin bodies during operation of the motor was measured, and the results are illustrated in FIGS. 5A and 5B.

FIG. 5A is a diagram illustrating the degree of stress occurring on a side cover portion of a bobbin body according to a comparative example, and FIG. 5B is a diagram illustrating the degree of stress occurring on a side cover portion of a bobbin body according to an example of the present disclosure.

As illustrated in FIGS. 5A and 5B, the stress occurring on the corresponding portion according to the comparative example was measured to be 105.01 MPa, while the stress occurring on the corresponding portion according to the example was measured to be 93.953 MPa.

Thus, it can be seen that the stress occurring on the side cover portion of the bobbin body according to the example was reduced 10.5% from that according to the comparative example.

Although the examples of the present disclosure have been described for illustrative purposes, those skilled in the art will appreciate that various modifications, additions, and substitutions are possible, without departing from the scope and spirit of the present disclosure as disclosed in the accompanying claims.

What is claimed is:

1. A bobbin for a motor, the bobbin comprising:
a bobbin body on which a superconducting coil is wound; and
a reinforcement comprising a reinforced plastic comprising a reinforcing fiber, wherein the reinforcement is configured to surround a side surface of the bobbin body,
wherein the bobbin body comprises:
a core on which the superconducting coil is wound; and
a cover configured to cover an outer portion of the superconducting coil, wherein the cover is spaced apart from the core by a space in which the superconducting coil is wound on the core, and
wherein the reinforcement surrounds a side surface of the cover.

2. The bobbin of claim 1, wherein the bobbin body is made of one selected from among aluminum (Al), Al alloy, steel, steel alloy, stainless steel, and an electrical sheet, and wherein the reinforcement is made of carbon fiber reinforced plastic (CFRP).

3. The bobbin of claim 1, wherein the reinforcement surrounds the cover of the bobbin body in an area corresponding to an area in which the superconducting coil is wound.

4. The bobbin of claim 3, wherein the reinforcement surrounds the cover of the bobbin at a height that is equal to a height at which the superconducting coil is wound.

5. The bobbin of claim 3, wherein a height of a top portion of the reinforcement is lower than or equal to a height of a top portion of a winding of the superconducting coil, and
wherein a height of a bottom portion of the reinforcement is lower than or equal to a height of a bottom portion of the winding of the superconducting coil.

6. The bobbin of claim 1, wherein the superconducting coil is wound in a racetrack shape comprising a pair of linear portions parallel to each other and a pair of arc portions each connecting corresponding ends of the pair of linear portions, and
wherein a ratio of a thickness of the cover covering the linear portions of the superconducting coil to a thickness of the reinforcement is in a range of about 2:1 to about 2:2.

7. The bobbin of claim 1, wherein a thickness of the reinforcement is in a range of about 0.05 mm to 5 mm.

8. The bobbin of claim 1, wherein the bobbin body is made of one selected from among aluminum (Al), Al alloy, steel, steel alloy, stainless steel, and an electrical sheet, and wherein the reinforcing fiber comprises a glass fiber.

9. A motor, comprising:
a superconducting coil; and
a bobbin, wherein the bobbin comprises:
a bobbin body on which the superconducting coil is wound; and
a reinforcement comprising a reinforced plastic comprising a reinforcing fiber,
wherein the reinforcement is configured to surround a side surface of the bobbin body,
wherein the bobbin body comprises:
a core on which the superconducting coil is wound; and
a cover configured to cover an outer portion of the superconducting coil, wherein the cover is spaced apart from the core by a space in which the superconducting coil is wound on the core, and
wherein the reinforcement surrounds a side surface of the cover.

10. The motor of claim 9, wherein the bobbin body is made of one selected from among aluminum (Al), Al alloy, steel, steel alloy, stainless steel, and an electrical sheet, and wherein the reinforcement is made of carbon fiber reinforced plastic (CFRP).

11. The motor of claim 9, wherein the reinforcement surrounds the cover of the bobbin body in an area corresponding to an area in which the superconducting coil is wound.

12. The motor of claim 9, wherein the reinforcement surrounds the cover of the bobbin at a height that is equal to a height at which the superconducting coil is wound.

13. The motor of claim 9, wherein a height of a top portion of the reinforcement is lower than or equal to a height of a top portion of a winding of the superconducting coil, and
wherein a height of a bottom portion of the reinforcement is lower than or equal to a height of a bottom portion of the winding of the superconducting coil.

14. The motor of claim 9, wherein the superconducting coil is wound in a racetrack shape comprising a pair of linear portions parallel to each other and a pair of arc portions each connecting corresponding ends of the pair of linear portions, and
wherein a ratio of a thickness of the cover covering the linear portions of the superconducting coil to a thickness of the reinforcement is in a range of about 2:1 to about 2:2.

15. The motor of claim 9, wherein a thickness of the reinforcement is in a range of about 0.05 mm to 5 mm.

16. The motor of claim 9, wherein the bobbin body is made of one selected from among aluminum (Al), Al alloy, steel, steel alloy, stainless steel, and an electrical sheet, and wherein the reinforcing fiber comprises a glass fiber.

17. A bobbin for a motor, the bobbin comprising:

a bobbin body on which a superconducting coil is wound; and a reinforcement comprising a reinforced plastic comprising a reinforcing fiber, wherein the reinforcement is configured to surround a side surface of the bobbin body, wherein the bobbin body is made of one selected from among aluminum (Al), Al alloy, steel, steel alloy, stainless steel, and an electrical sheet, and wherein the reinforcement comprises at least one of a glass fiber or a carbon fiber reinforced plastic (CFRP).

18. The bobbin of claim 17, wherein the reinforcement surrounds a cover of the bobbin body in an area corresponding to an area in which the superconducting coil is wound.

\* \* \* \* \*